E. P. VINING.

RAILWAY CAR BRAKE.

No. 10,077. Reissued Apr. 4, 1882.

Witnesses.
R. H. Whittlesey
C. L. Parker

Inventor Edward P. Vining
By Attorney George H. Christy

N. PETERS, Photo-Lithographer, Washington, D. C.

UNITED STATES PATENT OFFICE.

EDWARD P. VINING, OF OMAHA, NEBRASKA.

RAILWAY-CAR BRAKE.

SPECIFICATION forming part of Reissued Letters Patent No. 10,077, dated April 4, 1882.

Original No. 101,791, dated April 12, 1870. Application for reissue filed March 4, 1882.

*To all whom it may concern:*

Be it known that I, EDWARD P. VINING, of Omaha, county of Douglas, State of Nebraska, (late of Grand Rapids, Michigan,) have invented certain new and useful Improvements in Automatic Car-Brakes, of which the following is a specification.

My invention relates to an automatic car-brake operated through the buffer or draw-bar when the cars are in motion; and it consists in the construction and arrangement of parts, as hereinafter described.

Figure 1:
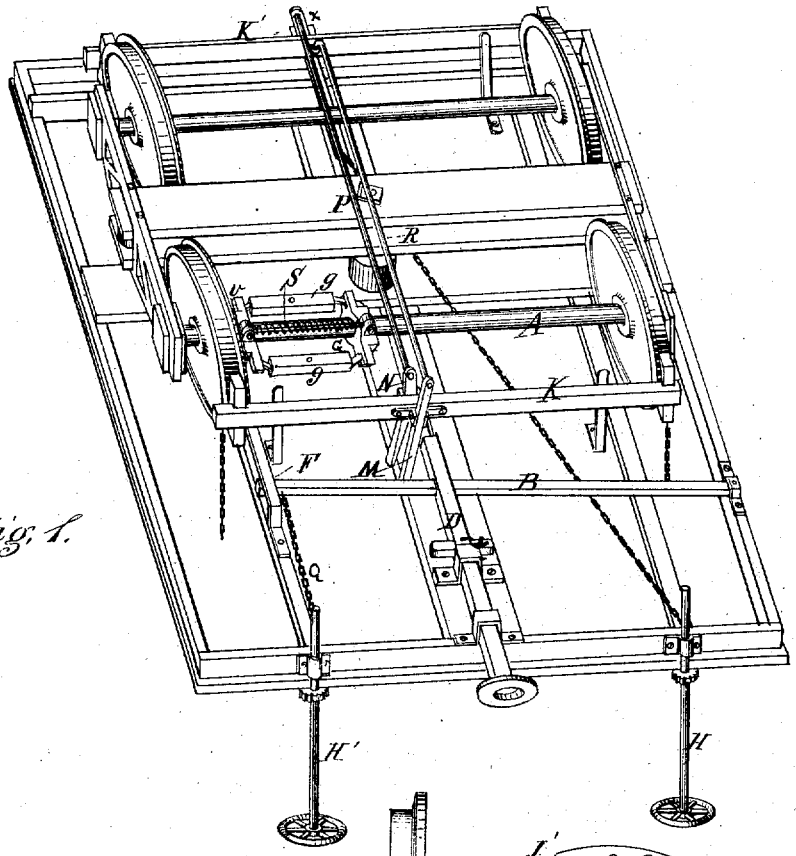
Figure 2:
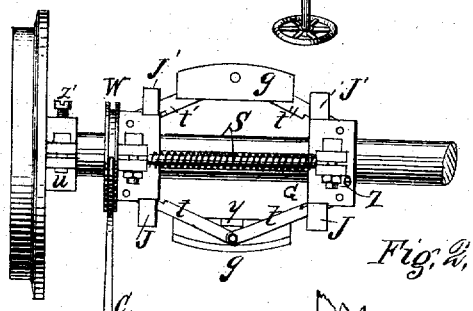
Figure 3:
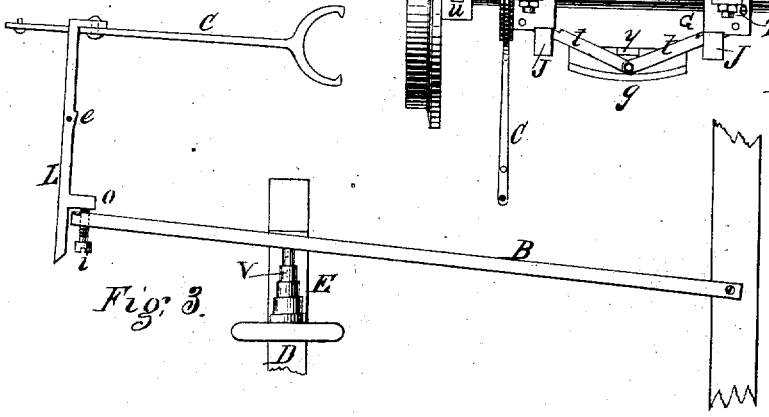

Figure 1 of the accompanying drawings is designed to represent a perspective view of an inverted car to which my invention is attached. Fig. 2 represents the horizontal governor used in my invention as the same appears when the cars are in motion. Fig. 3 represents the arrangement and connection of the principal levers used in operating my invention.

In Fig. 1, A represents the front axle-tree of the car with the governor G attached, as it appears when the cars are at rest.

The governor is constructed as follows: At each end of the governor is a collar constructed in two parts, so grooved out in the center as to form a circular hole when the two parts of the collar are put together. These collars are applied to the front axle of the car, and each collar firmly put together by means of strong screws. The circular hole through the collar or end of the governor farthest from the wheel of the car is made a little smaller than the axle, and thus, when put together upon the axle, clasps it firmly, and thus renders this end of the governor immovable with reference to the axle. The diameter of the circular hole through the other end of the governor is made a little larger than the diameter of the axle, thus allowing this end of the governor to move freely upon the axle. The two ends of the governor are attached together by means of two bars upon each side, as shown in Fig. 2 by letters *t t* and *t′ t′*. The bars *t t* and *t′ t′* pass through slots in the projections J J and J′ J′, and are attached to the end of the governor by means of movable bolts or rivets. The weights *g g* are grooved or slotted so as to fit upon these bars. The bars are fitted together so as to form a joint midway between the ends of the governor, and the weights are then fitted to them and fastened by means of a rivet which passes through the weight and through the ends of the bars, thus attaching the bars together, and forming a joint at or near the center of the weight.

The weights are provided with wedges, which fit into the grooves already described on the inner side of the joints formed by the bars *t t* and *t′ t′*. The wedge is shown in Fig. 2 by *y*, and is designed to hold and keep the weight in its proper place when the cars are in motion, as shown in Fig. 2.

On either side of the governor and between the two weights is a spiral spring. (Shown in Figs. 1 and 2 by S.) Through the spring and through the movable end of the governor is passed a strong rod or bolt, one end of which is fastened into the immovable end of the governor, and the other end is firmly fastened into the collar U, as shown in Fig. 2.

The spring S, moving on the rod, serves to keep the collars or ends of the governor apart until overcome by the centrifugal force of the weights *g* when the cars are in motion.

The collar U is made in the same manner as the immovable end of the governor, and similarly attached to the axle. Both the collar U and the immovable end of the governor are provided with set-screws, as shown in Fig. 2 by Z Z′, for the purpose of tightening them upon the axle when desired.

The projections J J and J′ J′ are each provided with a rectangular slot. The bars which pass through these slots are also made rectangular in form, fitting closely into them, but being much less in width than the length of the slots, in order that they may move freely in the slots as the governor is expanded and contracted. These slots hold the bars firmly in their place, thus greatly strengthening the governor, and at the same time prevent too great expansion.

The projections may be provided with set-screws passing from the upper or outer end down into the slots, by means of which screws the expansion may be regulated as required.

W represents a wheel attached to the movable end of the governor, so as to move with it. The outer edge of this wheel is grooved or slotted, as shown in Fig. 2.

C represents a lever, with one end forked and clutched, so as to fit into and engage with the grooved or slotted portion of the wheel above described. This lever passes upward, and is attached at the upper end of the frame-work of the car. At some distance from the upper end it is attached by a rod or some suitable attachment to the lever L, as shown in Fig. 3. The lever L is made of iron or some other suitable material, and is fitted into a longitudinal slot in the frame-work of the car, and is held in its place by the pivot *e*, upon which it turns freely. It is provided with a projection or shoulder, *o*, near to its front end, which end is beveled or wedge-shaped.

In Figs. 1 and 3, B represents a strong bar, one end of which is attached to the frame-work of the car by a bolt, upon which it turns freely. The other end of this bar is held by the slot F, in which it moves freely between the front end of said slot and the shoulder *o*, or between the front end and the beveled end of the lever L, as may be required.

K K′ represent the brakes.

M represents a lever, attached to the brake K by means of a bolt, upon which it moves as a fulcrum. One end of this lever is attached to the rod R, which passes under the car, and is attached to the brake K′ at the back end of the car.

D represents the ordinary draw-bar or buffer, and is attached to the cross-bar B in the manner shown.

When the train is in motion the governor expands, as shown in Fig. 2, drawing the clutched end of the lever toward the immovable end of the governor, thus throwing the front end of the lever L partially out of the slot F, allowing the bar B to play between the front end of this slot and the shoulder *o*. When the train is in motion and the engine is thrown back upon the train, or the train is forced upon the engine, or one car is pressed upon another, the brakes are immediately applied to the car or cars so pressing upon the car in advance in the following manner: The draw-bar D presses back through the volute spring V upon cross-bar B, forcing the movable end against the upper end of the lever M, pressing the front brake, K, against the front wheels of the car, and at the same time, by means of the rod R, draw the brake K′ against the back wheels of the truck. The movable end of the bar B is provided with the set-screw *i*, by means of which the pressure upon the brake may be regulated as required. When the car is not in motion the lever L is pressed back into the slot F, and if the engine is backed upon the train in a state of rest or when moving slowly the beveled end of the lever L engages with the notch in the bar B, thus enabling the train to be moved backward at any desired speed and distance without applying the brakes to the train. The end of the lever L thus acts as a stop or detent to engage with or be disengaged from the bar B. By means of the brake H′ and the chain Q the bar B may easily and quickly be fastened or locked, so as to prevent entirely the operation of the automatic brake above described.

H represents an ordinary brake-stand attached by a chain to the lever *x*, which lever is operated in the same manner as the lever M, already described. The tightening of the chain by means of the hand-stand H draws the brakes K′ against the back wheels of the truck. The lower end of the lever *x*, being attached by means of the rod P to the lower end of the lever N, draws the front brake upon the front wheels of the car.

The object of my invention is to place the entire train under the control of one person, when necessary. The engineer will have as complete control over the whole train as he would have over the engine if detached from the train. He can instantly apply the brakes, in case of emergency, to every car in the train and remove them as quickly when the emergency is over. In this way the train can be checked much more quickly than by the ordinary brake, thus in many cases preventing serious accidents. This brake can be used with or without the ordinary brake, and does not interfere with its operation in any manner.

What I claim to have invented, and desire to secure by Letters Patent, is—

1. A horizontal centrifugal governor having jointed arms, weights, and a spring arranged on the axle of a car, in combination with the draw-bar of the car and with an interposed stop or detent arranged to be actuated by the governor, substantially as and for the purpose above set forth.

2. The arrangement of the governor G, the grooved wheel W, the collar U, forked lever C, and the lever L in such manner as to force the front end of the lever L outwardly when the train is in rapid motion, allowing the bar B to be pressed back upon the lever M, as above set forth, thus applying the brakes to the wheels of the car.

3. The construction and arrangement of the bar B, in combination with the lever M, brakes K and K′, rod R, and draw-bar D, when used and operated substantially as above described.

4. The arrangement of the rods R P and levers M N, in combination with bar B, to operate the brake either by hand or automatically, substantially as herein described.

5. The arrangement of the brake-stand H′ and chain Q, in connection with the bar B, as above set forth, for the purpose of preventing the operation of the automatic brake when desired.

In witness whereof I have hereunto set my hand.

EDWARD P. VINING.

Witnesses:
JAY FIELDS,
SIDNEY DILLON.